(12) United States Patent
Peng et al.

(10) Patent No.: US 12,183,032 B2
(45) Date of Patent: Dec. 31, 2024

(54) METHOD AND APPARATUS FOR SIMULTANEOUS LOCALIZATION AND MAPPING, AND COMPUTER-READABLE STORAGE MEDIUM

(71) Applicant: SAMSUNG ELECTRONICS CO., LTD., Suwon-si (KR)

(72) Inventors: Xiongfeng Peng, Beijing (CN); Zhihua Liu, Beijing (CN); Qiang Wang, Beijing (CN); Yuntae Kim, Seoul (KR); Hongseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 430 days.

(21) Appl. No.: 17/681,179

(22) Filed: Feb. 25, 2022

(65) Prior Publication Data
US 2022/0277479 A1    Sep. 1, 2022

(30) Foreign Application Priority Data

Feb. 26, 2021 (CN) ......................... 202110221233.4
Nov. 30, 2021 (KR) ......................... 10-2021-0169346

(51) Int. Cl.
*G06T 7/73*    (2017.01)
*G06T 7/246*    (2017.01)

(52) U.S. Cl.
CPC ............... *G06T 7/74* (2017.01); *G06T 7/248* (2017.01); *G06T 2207/30244* (2013.01)

(58) Field of Classification Search
CPC .............. G06T 7/74; G06T 7/248; G06T 2207/30244; G06T 7/579; G06T 7/246
See application file for complete search history.

(56) References Cited

U.S. PATENT DOCUMENTS

| | | | |
|---|---|---|---|
| 2015/0286893 A1* | 10/2015 | Straub | G06V 10/243 |
| | | | 382/154 |
| 2019/0114777 A1* | 4/2019 | Maity | G06T 7/579 |
| 2019/0234746 A1* | 8/2019 | Zhang | G06T 7/73 |
| 2019/0236797 A1 | 8/2019 | Thyagharajan et al. | |
| 2020/0184232 A1 | 6/2020 | Luo et al. | |

(Continued)

FOREIGN PATENT DOCUMENTS

CN    112802096 A    5/2021

OTHER PUBLICATIONS

Pumarola et al., PL-SLAM: Real-Time Monocular Visual SLAM with Points and Lines, 2017 IEEE International Conference on Robotics and Automation (ICRA) Singapore, May 29-Jun. 3, 2017 (Year: 2017).*

(Continued)

*Primary Examiner* — Aaron W Carter
(74) *Attorney, Agent, or Firm* — Sughrue Mion, PLLC

(57) ABSTRACT

Provided is a method of simultaneous localization and mapping (SLAM), the method including obtaining a structure of a current image frame, obtaining a structure re-identification constraint based on the structure of the current image frame, and obtaining a SLAM result based on the structure re-identification constraint. By introducing the structure re-identification constraint in a bundle adjustment process to obtain the SLAM result, error accumulation may be more easily controlled, and accuracy and robustness in obtaining the SLAM result may be improved.

20 Claims, 12 Drawing Sheets

(56) References Cited

U.S. PATENT DOCUMENTS

| | | | |
|---|---|---|---|
| 2020/0218929 A1* | 7/2020 | Li | G06V 20/10 |
| 2020/0240793 A1* | 7/2020 | Li | G01C 21/12 |
| 2020/0349730 A1* | 11/2020 | Chen | G06T 7/579 |
| 2021/0042996 A1* | 2/2021 | Das | G06T 7/75 |
| 2021/0150755 A1 | 5/2021 | Gao et al. | |
| 2021/0373165 A1* | 12/2021 | Brenner | G01S 17/86 |
| 2022/0172386 A1* | 6/2022 | Liu | G06T 7/73 |
| 2022/0237814 A1* | 7/2022 | Pi | G06N 3/044 |
| 2022/0277479 A1* | 9/2022 | Peng | G06T 7/248 |
| 2022/0300738 A1* | 9/2022 | Hu | G06V 20/64 |
| 2022/0374025 A1* | 11/2022 | Biber | G05D 1/0214 |
| 2023/0186496 A1* | 6/2023 | Choset | G01C 21/3848 |
| | | | 382/154 |
| 2023/0281867 A1* | 9/2023 | Peng | G06T 7/60 |
| | | | 382/103 |
| 2024/0029297 A1* | 1/2024 | Zhou | G06T 7/73 |

OTHER PUBLICATIONS

Peng et al., "Accurate Visual-Inertial SLAM by Manhattan Frame Re-identification", 2021 IEEE/RSJ International Conference on Intelligent Robots and Systems (IROS) Sep. 27-Oct. 1, 2021. Prague, Czech Republic (Year: 2021).*

Guo et al., "Large-Scale Cooperative 3D Visual-Inertial Mapping in a Manhattan World", 2016 IEEE International Conference on Robotics and Automation (ICRA) Stockholm, Sweden, May 16-21, 2016 (Year: 2016).*

Liu, Ruyu et al., "Accurate real-time visual SLAM combining building models and GPS for mobile robot", Journel of Rel-Time Image Processing, Jun. 7, 2020. (11 pages total).

Zhang, Xiaoyu et al., "Point-Plane SLAM Using Supposed Planes for Indoor Environments", Sensors, Sep. 2, 2019, vol. 19, No. 3795, doi: 10.3390/s19173795, www.mdpi.com/journal/sensors. (20 pages total).

Liu, Haomin et al., "ICE-BA: Incremental, Consistent and Efficient Bundle Adjustment for Visual-Inertial SLAM", CVF, 2018, pp. 1974-1982.

Qin, Tong et al., "VINS-Mono: A Robust and Versatile Monocular Visual-Inertial State Estimator", arXiv:1708.03852v1 [cs.RO], Aug. 13, 2017. (17 pages total).

Campos, Carlos et al., "ORB-SLAM3: An Accurate Open-Source Library for Visual, Visual-Inertial and Multi-Map SLAM", IEEE Transactions and Robotics, arXiv:2007.11898v2 [cs.RO], Apr. 23, 2021. (18 pages total).

Gomez-Ojeda, Ruben et al., "PL-SLAM: a Stereo SLAM System through the Combination of Points and Line Segments", arXiv:1705.09479v2 [cs.CV], Apr. 9, 2018. (13 pages total).

Peng, Xiongfeng et al., "Accurate Visual-Inertial SLAM by Feature Re-identification", IEEE IROS, 2021. (8 pages total).

* cited by examiner

METHOD AND APPARATUS FOR SIMULTANEOUS LOCALIZATION AND MAPPING, AND COMPUTER-READABLE STORAGE MEDIUM

CROSS-REFERENCE TO RELATED APPLICATION

This application is based on and claims priority under 35 U. S. C. § 119 to Chinese Patent Applications No. 202110221233.4, filed on Feb. 26, 2021, in the China National Intellectual Property Office, and Korean Patent Application No. 10-2021-0169346, filed on Nov. 30, 2021, in the Korean Intellectual Property Office, the disclosures of which are incorporated by reference herein in their entireties.

BACKGROUND

1. Field

Example embodiments of the present disclosure relate to a localization technology, and more particularly, to a method and an apparatus for simultaneous localization and mapping, and a computer-readable storage medium.

2. Description of Related Art

A technology of simultaneously constructing a three-dimensional map of a space in which a device is located and simultaneously determining a location and pose of the device in the map by using sensors such as a camera and an inertial measurement unit on the device is called simultaneous localization and mapping (SLAM). A camera and an inertial measurement unit, which are relatively cheaper than a light detection and ranging (LiDAR) sensor, are constituent elements of devices such as cellular phones, augmented reality glasses, and indoor robots, and may be used in various situations. Therefore, a main study target of every existing SLAM technology is a method of simultaneously constructing a map and obtaining a pose of a device by using a camera and an inertial measurement unit as sensors. Compared with a monocular camera, a binocular camera constructs a three-dimensional map with an actual physical scale, and therefore, in actual application, a visual sensor of a device is usually a binocular camera.

The existing vision-based SLAM system mainly uses tracking-matching on feature points and feature lines of an image, according to a multi-view geographic theory, to obtain a pose of a device, where a pose of a device denotes a spatial three-dimensional location and direction of the device, and three-dimensional environment information. However, because the existing SLAM system does not suppress a trajectory drift sufficiently, the robustness in obtaining a SLAM result becomes relatively poor, and therefore, improvement of the existing SLAM method is required.

SUMMARY

According to an aspect of an example embodiment, there is provided a method of simultaneous localization and mapping (SLAM), the method including obtaining a structure of a current image frame, obtaining a structure re-identification constraint based on the structure of the current image frame, and obtaining a SLAM result based on the structure re-identification constraint.

The method may further include obtaining points of the current image frame and lines of the current image frame, and re-identifying points of the current image frame and lines of the current image frame to obtain a point-line re-identification constraint, wherein the obtaining of the SLAM result based on the structure re-identification constraint may include obtaining the SLAM result based on the point-line re-identification constraint and the structure re-identification constraint.

The obtaining of the structure of the current image frame may include obtaining a primary structure of the current image frame based on the lines of the current image frame, and optimizing the primary structure based on the lines that satisfy preset conditions in the current image frame, to obtain the structure.

The obtaining of the structure re-identification constraint according to the structure of the current image frame may include obtaining a global sub map based on the current image frame and a key image frame, and re-identifying the structure based on the global sub map to obtain the structure re-identification constraint.

The obtaining of the global sub map based on the current image frame and the key image frame may include obtaining the global sub map based on a time sequence relationship between the current image frame and the key image frame, and obtaining a spatial relationship between three-dimensional maps respectively corresponding to the current image frame and the key image frame.

The obtaining of the global sub map, based on the time sequence relationship between the current image frame and the key image frame and the spatial relationship between three-dimensional maps respectively corresponding to the current image frame and the key image frame may include obtaining a reference key image frame of the current image frame based on the time sequence relationship between the current image frame and the key image frame, determining the key image frame, which has an area overlapping with the reference key image frame on a spatial distribution, as a key image frame having a spatial common view with the current image frame, based on the spatial relationship between a three-dimensional map corresponding to the current image frame and the three-dimensional map corresponding to the key image frame, and obtaining the global sub map based on the key image frame having the spatial common view.

The re-identifying of the structure based on the global sub map may include obtaining the key image frame having a spatial common view with the current image frame based on the global sub map, and re-identifying the structure based on a common view correlation structure of the key image frame having the spatial common view.

The re-identifying of the structure based on the common view correlation structure of the spatial common view key image frame may include performing a time consistency test on the structure based on the structure of the current image frame and a time correlation structure of a first preset time sequence sliding window corresponding to the structure of the current image frame, matching structures based on the time correlation structure of an image frame in a second preset time sequence sliding window corresponding to the current image frame and a spatial common view correlation structure of a frame in a third preset time sequence sliding window corresponding to the key image frame having the spatial common view based on the time consistency test on the structure having passed, and performing a time-space consistency test on the structure based on the time correlation structure and the key image frame having the spatial common view corresponding to the time correlation structure.

The performing of the time consistency test on the structure, based on the structure of the current image frame and the time correlation structure of the first preset time sequence sliding window corresponding to the structure of the current image frame, may include obtaining a relative rotation error between the structure of the current image frame and the time correlation structure of the image frame in the first preset time sequence sliding window corresponding to the structure of the current image frame, and performing the time consistency test on the structure based on every relative rotation error corresponding to the first preset time sequence sliding window.

The performing of the time-space consistency test on the structure, based on the time correlation structure and the key image frame having the spatial common view corresponding to the time correlation structure, may include obtaining a relative rotation drift error between the time correlation structure and the key image frame having the spatial common view corresponding to the time correlation structure, obtaining relative rotation drift errors corresponding to the second preset time sliding window and the third preset time sequence sliding window, and performing the time-space consistency test based on the relative rotation drift errors corresponding to the second preset time sequence sliding window and the third preset time sequence sliding window.

The obtaining of the SLAM result, based on the point-line re-identification constraint and the structure re-identification constraint, may include obtaining a SLAM result after global bundle adjustment based on the point-line re-identification constraint and the structure re-identification constraint, and obtaining the SLAM result by performing local bundle adjustment on the SLAM result after the global bundle adjustment based on a point-line re-identification constraint of all image frames in a fourth preset time sequence sliding window corresponding to the current image frame.

According to another aspect of an example embodiment, there is provided an apparatus for simultaneous localization and mapping (SLAM), the apparatus including at least one processor configured to obtain a structure of a current image frame, obtain a structure re-identification constraint based on the structure of the current image frame, and obtain a SLAM result based on the structure re-identification constraint.

According to another aspect of an example embodiment, there is provided an electronic device including a memory configured to store a computer program, and a processor configured to execute the computer program to implement a method including obtaining a structure of a current image frame, obtaining a structure re-identification constraint based on the structure of the current image frame, and obtaining a SLAM result based on the structure re-identification constraint.

According to another aspect of an example embodiment, there is provided a computer-readable storage medium having stored thereon a computer program which, when executed, implements a method including obtaining a structure of a current image frame, obtaining a structure re-identification constraint based on the structure of the current image frame, and obtaining a SLAM result based on the structure re-identification constraint.

The processor may be further configured to obtain points of the current image frame and lines of the current image frame, and re-identify the points of the current image frame and lines of the current image frame to obtain a point-line re-identification constraint, wherein the obtaining of the SLAM result based on the structure re-identification constraint, may include obtaining the SLAM result based on the point-line re-identification constraint and the structure re-identification constraint.

The obtaining of the structure of the current image frame may include obtaining a primary structure of the current image frame based on the lines of the current image frame, and optimizing the primary structure based on the lines that satisfy preset conditions in the current image frame, to obtain the structure.

The obtaining of the structure re-identification constraint according to the structure of the current image frame may include obtaining a global sub map based on the current image frame and a key image frame, and re-identifying the structure based on the global sub map to obtain the structure re-identification constraint.

The obtaining of the global sub map based on the current image frame and the key image frame may include obtaining the global sub map based on a time sequence relationship between the current image frame and the key image frame, and obtaining a spatial relationship between three-dimensional maps respectively corresponding to the current image frame and the key image frame.

The obtaining of the global sub map, based on the time sequence relationship between the current image frame and the key image frame and the spatial relationship between three-dimensional maps respectively corresponding to the current image frame and the key image frame may include obtaining a reference key image frame of the current image frame based on the time sequence relationship between the current image frame and the key image frame, determining the key image frame, which has an area overlapping with the reference key image frame on a spatial distribution, as a key image frame having a spatial common view with the current image frame, based on the spatial relationship between a three-dimensional map corresponding to the current image frame and the three-dimensional map corresponding to the key image frame, and obtaining the global sub map based on the key image frame having the spatial common view.

The re-identifying of the structure based on the global sub map may include obtaining the key image frame having a spatial common view with the current image frame based on the global sub map, and re-identifying the structure based on a common view correlation structure of the key image frame having the spatial common view.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
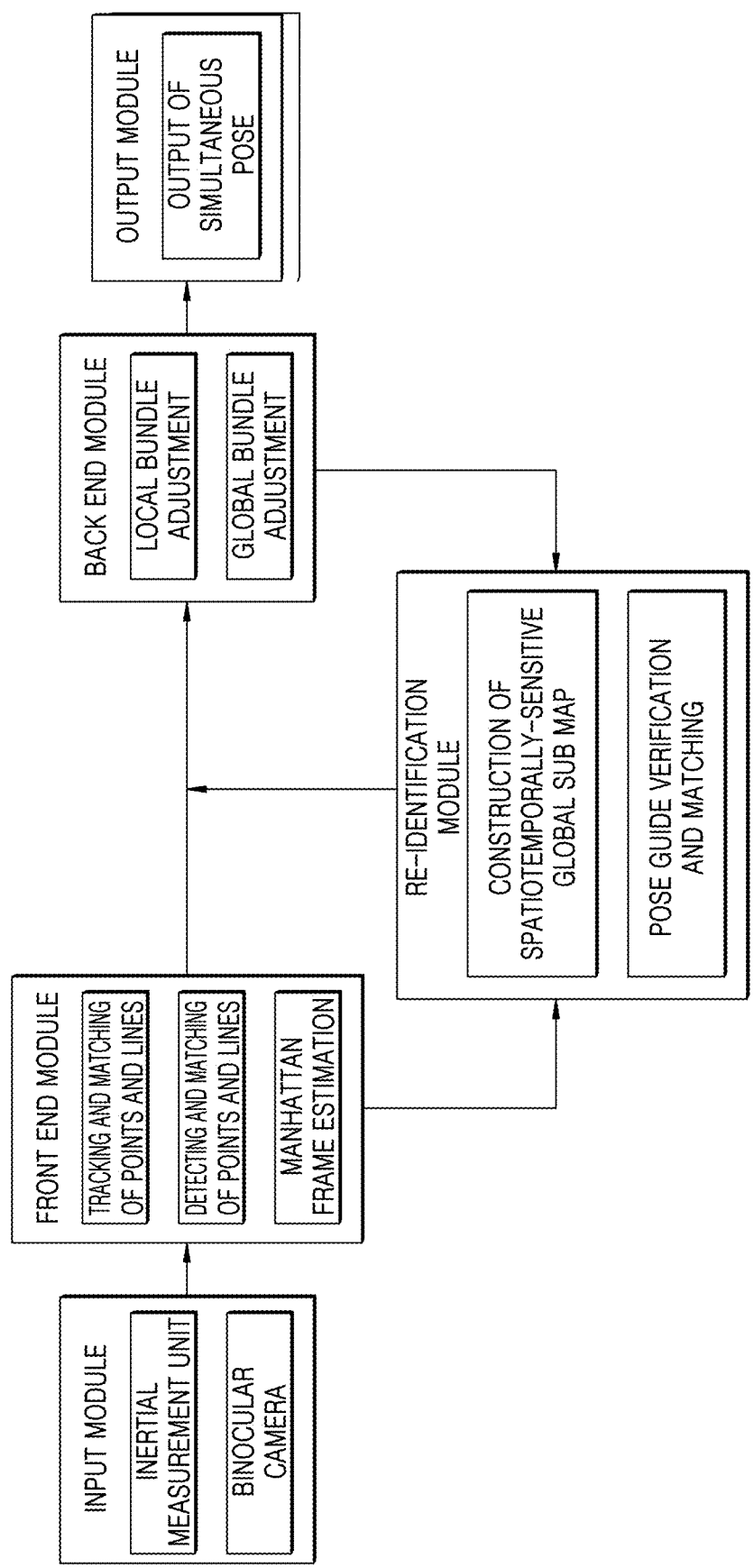
FIG. 1 is a structural diagram of a simultaneous localization and mapping (SLAM) system according to example embodiments.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein.

It will be understood that singular forms "a", "an", "the" also include plural forms, unless specified otherwise. It will be further understood that the term "include" indicates existence of features, integers, steps, operations, elements and/or components, not excluding existence or addition of one or more features, integers, steps, operations, elements, components and/or combinations thereof. It will be also understood, when it is said that an element is "connected" or "coupled" to another element, the element may be directly connected or coupled to the other element, or an element may exist therebetween. In addition, "connected" or "coupled" used herein may include wireless connection or wireless coupling. As used herein, the term "and/or" includes any and all combinations of one or more of the associated listed items. For example, the expression, "at least one of a, b, and c," should be understood as including only a, only b, only c, both a and b, both a and c, both b and c, or all of a, b, and c.

For more clear understanding about the purpose, technical solution, and advantageous effect of the present application, the example embodiments will be described in further detail with reference to the accompanying drawings.

In a related SLAM system, in detail, features of points and lines in video frequencies of images related to each other in time sequence may be traced and matched according to the multi-view geometry principle, features of points and lines in a binocular images may be matched according to the epipolar constraint, and this type of matching may construct a geometrical constraint relationship between a device pose and a three-dimensional map, and the device pose and the three-dimensional map may be calculated by the method of bundle adjustment.

A closed-loop method being popular recently may reduce an accumulated error. However, as the method has a relatively low recall rate and is effective only when a closed loop is found, history information is not sufficiently used to control a trajectory drift. According to another aspect, most of the related methods focus on general occasions, and less cases focus on specific occasions such as an artificial circumstance. The circumstances have very strong structural rules, and most of the circumstances undergo abstraction into a single box world (Manhattan world) or a plurality of box worlds on a horizontal plane (Atlanta world). In a Manhattan world circumstance, a plane or line in a vertical direction occupies a dominant position. These features are already used in interior three-dimensional reconstruction, scene understanding, and pose estimation. Using the Manhattan world hypothesis and the Atlanta world hypothesis may improve the robustness and accuracy of visual SLAM. However, both the Manhattan world hypothesis and the Atlanta world hypothesis have limitation of being only applied to general, ideal artificial circumstances. In most frequent real scenes, when including a plurality of box worlds, the box worlds respectively have different directions, and directions of the boxes at different positions may be very close to each other. When a tested box world is forced to be parallel to a single Manhattan world or Atlanta world, the performance and robustness of the box world may become even worse.

With respect to the technical problem, according to an aspect of an example embodiment, information regarding points, lines, and structures from among history map information are re-identified by using a method with high efficiency and accuracy. According to another aspect of an example embodiment, a scene is split according to positions, into a Manhattan world including a plurality of local portions, not a single Manhattan world of Atlanta world. A Manhattan world in each of the local portions is constructed by a combination of spatial common view correlation Manhattan frames. In other words, each new Manhattan world is re-identified by a spatial common view correlation Manhattan world corresponding to a local box world. In addition, when image information of a camera at a certain angle is not sufficient for Manhattan frame estimation, the estimation may be inaccurate, and it is not necessary to detect Manhattan frames every time. Test on the Manhattan frame may be allowed when a sufficient number of straight lines are found and a certain relationship exists between a relative rotation of the Manhattan frame and an output pose of the SLAM system. Like this, by having an algorithm more efficiently use feature information in a dimension different from that of the history map information, error accumulation may be prohibited with more accuracy and robustness.

In detail, the example embodiments suggest a new visual-inertial SLAM method, and the method introduces a method of re-identifying points, lines, and Manhattan frames based on the existing visual-related SLAM method. A simple summary of a method of re-identifying the point, lien, and the Manhattan frame may include first, detecting features of the points and lines from the current image frame and using the features of the lines to perform coarse-to-fine estimation on the Manhattan frame to obtain a Manhattan frame of the current image frame, second, using the global map generated by visual-inertial SLAM to construct a spatiotemporally-sensitive global sub map, and using the spatiotemporally-sensitive global sub map and methods of pose guide verification and matching to re-identify the points and lines, sequentially verifying time consistency and time-space consistency of the Manhattan frame, that is, re-identifying the Manhattan frame, and adding the re-identification constraint relationship among the point, line, and Manhattan frame to a cost function for the bundle adjustment to seek a solution for the pose and three-dimensional map of the device.

As shown in FIG. 1, performance of the SLAM method provided by the example embodiments is based on a SLAM system in the drawing. The SLAM system including an input module, a front-end module, a back-end module, a re-identification module, and an output module. The input module includes a relationship measuring device and a binocular camera, which are used by the user to obtain inertial measure data image data, respectively. The front-end module includes a pre-integration unit, a point-line detection and tracking-matching unit, and a Manhattan frame estimating unit for the inertial measurement data. The back-end module includes a global bundle adjustment unit and a local bundle adjustment unit. The re-identification module includes a spatiotemporally-sensitive global sub map construction unit and a pose guide verification and matching unit. The output module includes a simultaneous pose output unit. Functions of each unit included in each module will be described in detail in the following description of the SLAM method.

Figure 2:
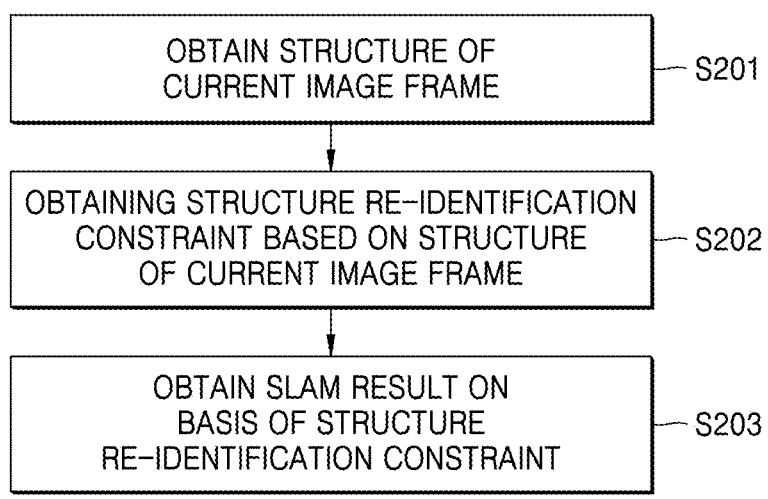
FIG. 2 is a flowchart of a SLAM method according to example embodiments.

FIG. 2 is a flowchart of the SLAM method provided by the example embodiments. As shown in FIG. 2, the method includes obtaining a structure of a current image frame (S201), obtaining a structure re-identification constraint based on the structure of the current image frame (S202), and obtaining a SLAM result based on the structure re-identification constraint (S203). By introducing structure re-identification restrict in a bundle adjustment process to obtain the SLAM result, the method may more easily control error accumulation, and may improve the accuracy and robustness in obtaining the SLAM result.

In example embodiments, the SLAM method will be described by using a structure such as a Manhattan frame. That is, the term "structure" will be replaced with "Manhattan frame" to describe the SLAM method, and the scope of the present disclosure is not limited thereto.

Furthermore, the method may include obtaining a pre-integration constraint of inertial measurement data corresponding to the current image frame, and obtaining point-line tracking constraints of a first class point and a first class line and a first point-line matching constraint corresponding to the current image frame.

Here, the first class point and the first class line are a point and line included in an image frame before the current image frame, and a second class point and a second class line are a point and line that are not included in the previous image frame. With reference to the image frame before the current image frame, the second class point and the second class line may be a point and line that are newly increased, for example, newly increased feature information. In an information process procedure on the current image frame, tracking and matching are carried out on the first class point and the first point line, and the second class point and the second class line are tested.

In detail, in obtaining of the image data, for example, obtaining the current image frame, and the inertial measurement data of the binocular camera, the pre-integration unit of the inertial measurement data performs pre-integration on the inertial measurement data between the current image frame and the previous image frame. The point-line detection and tracking-matching unit tracks features of points and lines of the current image frame, for example, the first class point and the first class line, detects features of new points and lines from a region where the features of points and lines do not exist, detects features of all points and lines of the current image frame from an image of another camera based on terminal constraints, obtains a first point-line matching constraint of the first class point and the first class line, and then obtains a second point-line matching constraint regarding the second class point and the second class line.

The method according to an example embodiment may also include obtaining the second class point and the second class line of the current image frame and obtaining a Manhattan frame of the current frame, based on the first class line and the second class line.

In detail, coarse-to-fine estimation is performed on the Manhattan frame by all line features, for example, the first class line and the second class line, of the current image frame, and a Manhattan frame of the current image frame is obtained.

The method according to an example embodiment may also include obtaining a second point-line matching constraint, a point-line re-identification constraint, and a Manhattan re-identification constraint, based on the second class point, the second class line, and the Manhattan frame.

In detail, in a re-identification module, a spatiotemporally-sensitive global sub map construction unit constructs a spatiotemporally-sensitive global sub map based on a spatial distribution relationship between a three-dimensional map corresponding to the current image frame and a three-dimensional map off each key image frame at a back end, and a time relationship between the current image frame and each key image frame at the back end. The pose guide matching unit obtains an image of a key image frame having a spatial common view with the image of the current image frame through the spatiotemporally-sensitive global sub map, and re-identifies the features of point and lines and a Manhattan frame newly detected with respect to the image of the current image frame.

The method according to an example embodiment may also include obtaining a SLAM result, based on the pre-integration constraint, the point-line tracking constraint, the point-line re-identification constraint, the first point-line matching constraint, the second point-line matching constraint, and the Manhattan frame re-identification constraint.

In detail, in the back-end module, a pose and three-dimensional map are optimized by performing bundle adjustment on the basis of the pre-integration constraint, the point-line tracking constraint, the point-line re-identification constraint, and the Manhattan frame re-identification constraint to obtain a SLAM result corresponding thereto, and a corresponding simultaneous pose is output through the output module.

In an example embodiment, the current image frame includes a key image frame, and the method of obtaining the SLAM result based on the pre-integration constraint, the point-line tracking constraint, the first point-line matching constraint, the second point-line matching constraint, the point-line re-identification constraint, and the Manhattan frame re-identification constraint may include obtaining an initial SLAM result corresponding to the current image frame, combining pre-integration constraints, point-line tracking constraints, first point-line matching constraints, second point-line matching constraints, point-line re-identification constraints and Manhattan-frame re-identification constraints on the basis of the pre-integration, the point-line tracking constraint, the first point-line matching constraint, the second point-line matching constraint, the point-line re-identification constraint, and the Manhattan frame re-identification constraint, and obtaining a SLAM result after global bundle adjustment by performing global bundle adjustment on the initial SLAM result, and obtaining a SLAM result by performing local bundle adjustment on the SLAM result after the global bundle adjustment on the basis of the pre-integration constraint, point-line tracking constraint, first point-line matching constraint, and point-line re-identification constraint of all image frames in the fourth preset time sequence sliding window corresponding to the current image frame.

Here, whether pieces of information regarding newly added points and lines of the current image frame with reference to the previous key image frame thereof reaches a preset number may be determined. When the pieces of information reaches the preset number, the current image frame may be a key image frame, however, embodiments are not limited thereto. For example, the determination on the key image frame may be on the basis of other preset rules, for example, determining image frames at uniform intervals on the time sequence as the key image frame.

Here, the pre-integration constraint, the point-line tracking constraint, the first point-line matching constraint, the second point-line matching constraint, and the Manhattan frame re-identification constraint corresponding to all key image frames before the current image frame, and the pre-integration constraint, point-line tracking constraint, the first point-line matching constraint, and the point-line re-identification constraint of all image frames in the fourth preset time sequence sliding window corresponding to the current image frame may be obtained from the initial SLAM result, that is, from a global map corresponding to the initial SLAM result.

In detail, when the current image frame is determined as the key image frame, in a bundle adjustment process, first, global bundle adjustment is performed on the initial SLAM result to obtain a SLAM result after global bundle adjustment, and then local bundle adjustment is performed on the SLAM result after the global adjustment to obtain the SLAM result. When it is determined that the current image frame is not the key image frame, local bundle adjustment is performed on the initial SLAM result directly on the basis of the pre-integration constraint, the point-line tracking constraint, the first point-line matching constraint, and the point-line re-identification constraint of all image frames in the fourth preset time sequence sliding window corresponding to the current image frame, to thereby obtain the SLAM result.

Figure 3:
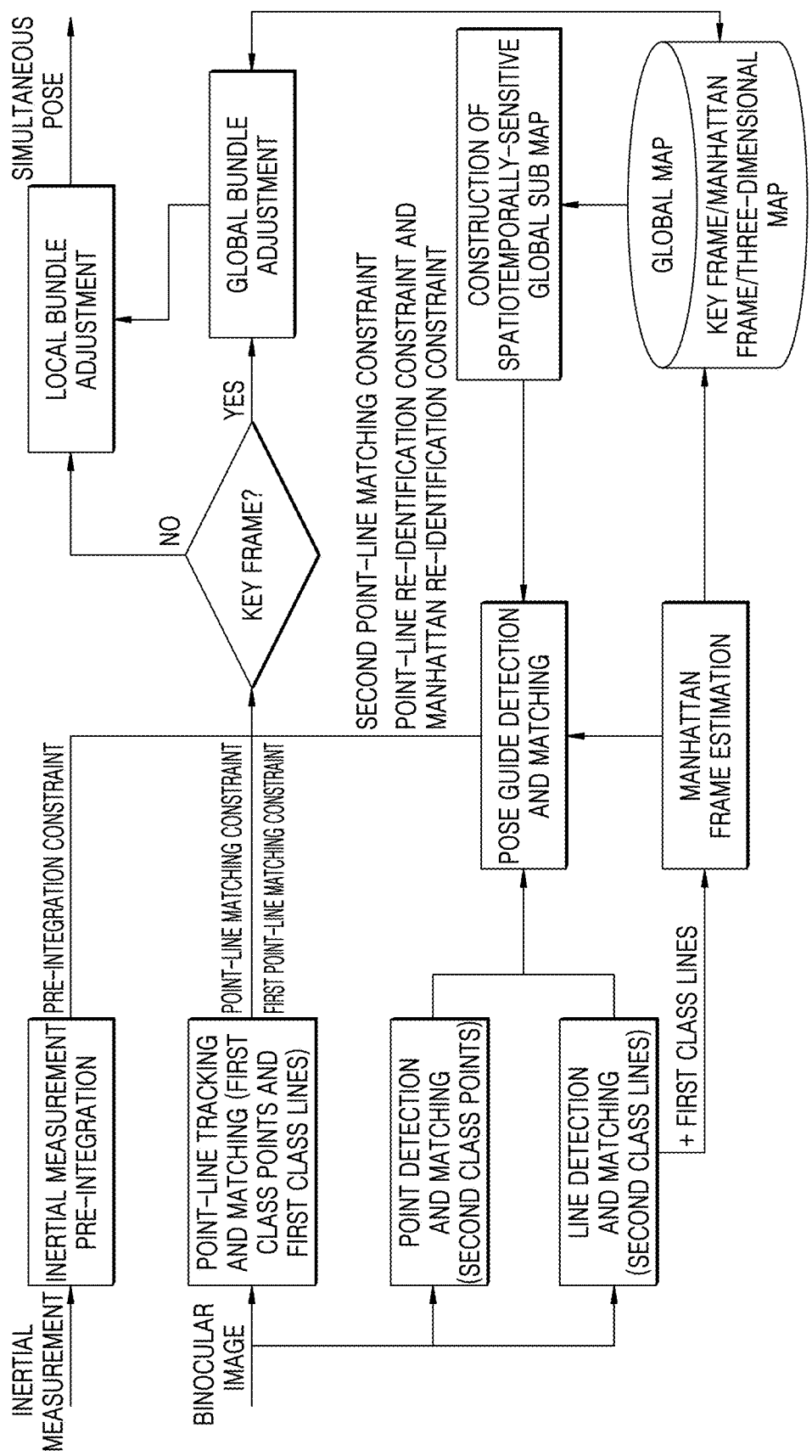
FIG. 3 is a detailed flowchart of a SLAM method according to an example embodiment.

For example, FIG. 3 illustrates a detailed flowchart of a SLAM method provided in the example embodiments. The SLAM method may include obtaining the image data and inertial measurement data of the binocular camera, performing pre-integration on data collected by the inertial measurement unit, the data between the current image frame and the previous image frame, tracking features of points and lines in a region in which features of points and lines do not exist and detecting new features of points and lines, detecting features of all of the points and lines of the current image from an image of another camera on the basis of a terminal constraint, and performing coarse-to-fine estimation on the Manhattan frame by using all features of the lines of the current image frame. According to another example embodiment, the processes may be performed only on the key image frame.

Next, the SLAM method according to an example embodiment may include a spatiotemporally-sensitive global sub map is constructed on the basis of a spatial distribution relationship between a three-dimensional map corresponding to the image of the current image frame and a three-dimensional map corresponding to an image of each key image frame at the back end, an image of a key image frame having a spatial common view with the image of the current image frame is obtained through the spatiotemporally-sensitive global sub map, and newly detected features of points and lines and the Manhattan frames are re-identified with respect to the image of the current image frame through features of points and lines of the image in the key image frame having the spatial common view and the Manhattan frame.

The SLAM method according to an example embodiment may also include, when there is a newly generated key image frame, a pose and a three-dimensional map in a global range is optimized by performing bundle adjustment on the tracking-matching and re-identification constraints of the features of points and lines of all the key image frames, a relative rotation constraint between the image having a spatial common view and the Manhattan frame, and the pre-integration constraint of the inertial measurement map. In addition, a pose and a three-dimensional map of a local range in a time region are optimized by performing bundle adjustment on the tracking matching and re-identification constraints of features of points and lines of all the image frames in the time sequence sliding window and the pre-integration constraint of the inertial measurement data.

In an example embodiment, a method of obtaining the Manhattan frame of the current image frame on the basis of the first class lines and the second class lines may include obtaining a first vanishing direction of the Manhattan frame through a minimal solution set algorithm of two line segments, based on two arbitrary lines from among the first class lines and the second class lines, obtaining a second vanishing direction of the Manhattan frame by performing a uniform angular sampling on a vertical circle on the first vanishing direction, and obtaining a third vanishing direction of the Manhattan frame of the first vanishing direction and the second vanishing direction, wherein a diameter of the vertical circle is identical to a diameter of an equivalent spherical surface of the current image frame, obtaining an initial Manhattan frame based on the first vanishing direction, the second vanishing direction, and the third vanishing direction, and obtaining inner line segments of three vanishing points of the initial Manhattan frame in the current image frame, and obtaining the Manhattan frame by optimizing the three vanishing directions of the initial Manhattan frame on the basis of the inner line segments of the three vanishing points.

Figure 4:
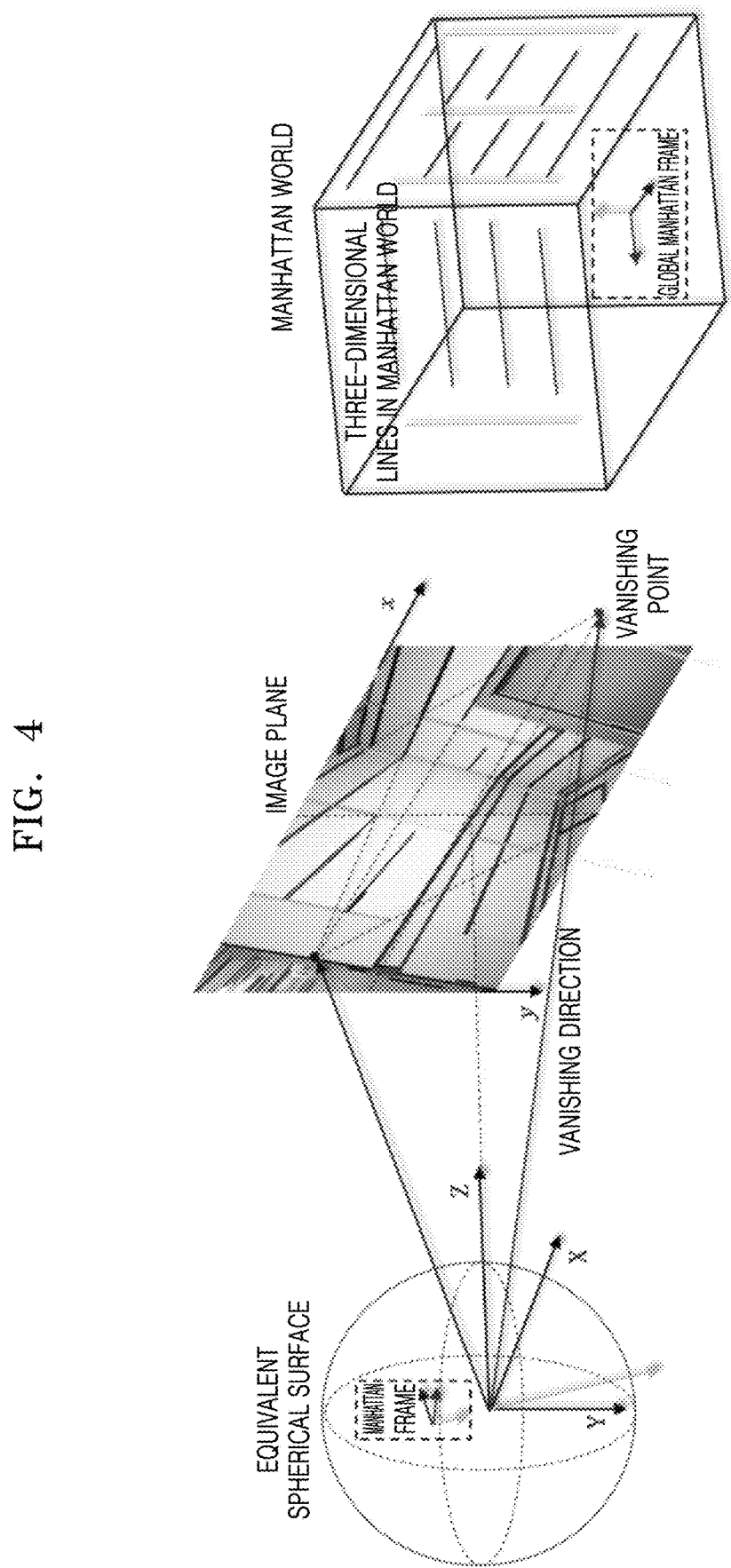
FIG. 4 is a diagram of the relationship among an image plane, an equivalent plane, and a Manhattan world according to an example embodiment.

In detail, a structured circumstance, for example, an artificial scene, shows particular regularity, for example, concurrency and orthogonality. As shown in FIG. 4, the Manhattan world denotes a scene having three vanishing directions orthogonal to one another on an equivalent spherical surface, the scene corresponding to three vanishing point on an image plane. In the Manhattan world, when all line segments detected from a calibrated image are given, the goal is to collect the line segments by using the three vanishing points. A Manhattan frame is widely used in a structure model of the Manhattan world, three axes of the Manhattan frame correspond to the three vanishing directions orthogonal to one another in the Manhattan world, and a three-dimensional line in the Manhattan world is parallel to three coordinate axes of the entire Manhattan frame. Based on this constraint, the three vanishing directions orthogonal to one another may be described again as a rotation between the Manhattan world and a camera frame, that is, the Manhattan frame.

In an example embodiment, a process of estimating the three vanishing directions orthogonal to one another (that is, the Manhattan frame) will be described in detail. Three vanishing points are estimated on the basis of features of detected image line segments, and the three vanishing directions orthogonal to one another are calculated by using the three vanishing points. The vanishing points may be calculated on the basis of a result of line clustering, and line clusters may be sequentially obtained when the vanishing points are estimated. Based on the estimation, a coarse-to-fine Manhattan frame estimation method is designed, the method mainly including a coarse estimation module and a fine estimation module. The coarse estimating module performs a global high-speed search for the three vanishing directions orthogonal to one another, and provides an initial value to the fine estimating module. The fine estimating module further optimizes a result of three vanishing directions on the basis of an output from the coarse estimating module. Example methods of executing the coarse estimating module and the fine estimating module will be described in detail.

In a coarse estimating module in an example embodiment, a minimum solution set of two line segments is used to establish a hypothesis in the first vanishing directions, sample the second vanishing direction, and generate the third vanishing direction through the first and second vanishing directions. For example, first, two line segments orthogonal to each other in the current image frame are arbitrarily selected, and the first vanishing direction $V_1$ is generated based on the two line segment orthogonal to each other. Next, a uniform angular sampling is performed on the vertical circle in the first vanishing direction $V_1$ to obtain the second vanishing direction $V_2$ of the Manhattan frame. The third vanishing direction $V_3$ is obtained by cross-multiplication of the first vanishing direction $V_1$ and the second vanishing direction $V_2$. After obtaining combinations of various vanishing directions through the three processes described above, the initial Manhattan frame is determined through hypothesis verification. For example, the most desirable three vanishing directions orthogonal to one another are determined through composition of polar grid. Here, the coarse estimation on the Manhattan frame is finished.

Figure 5:
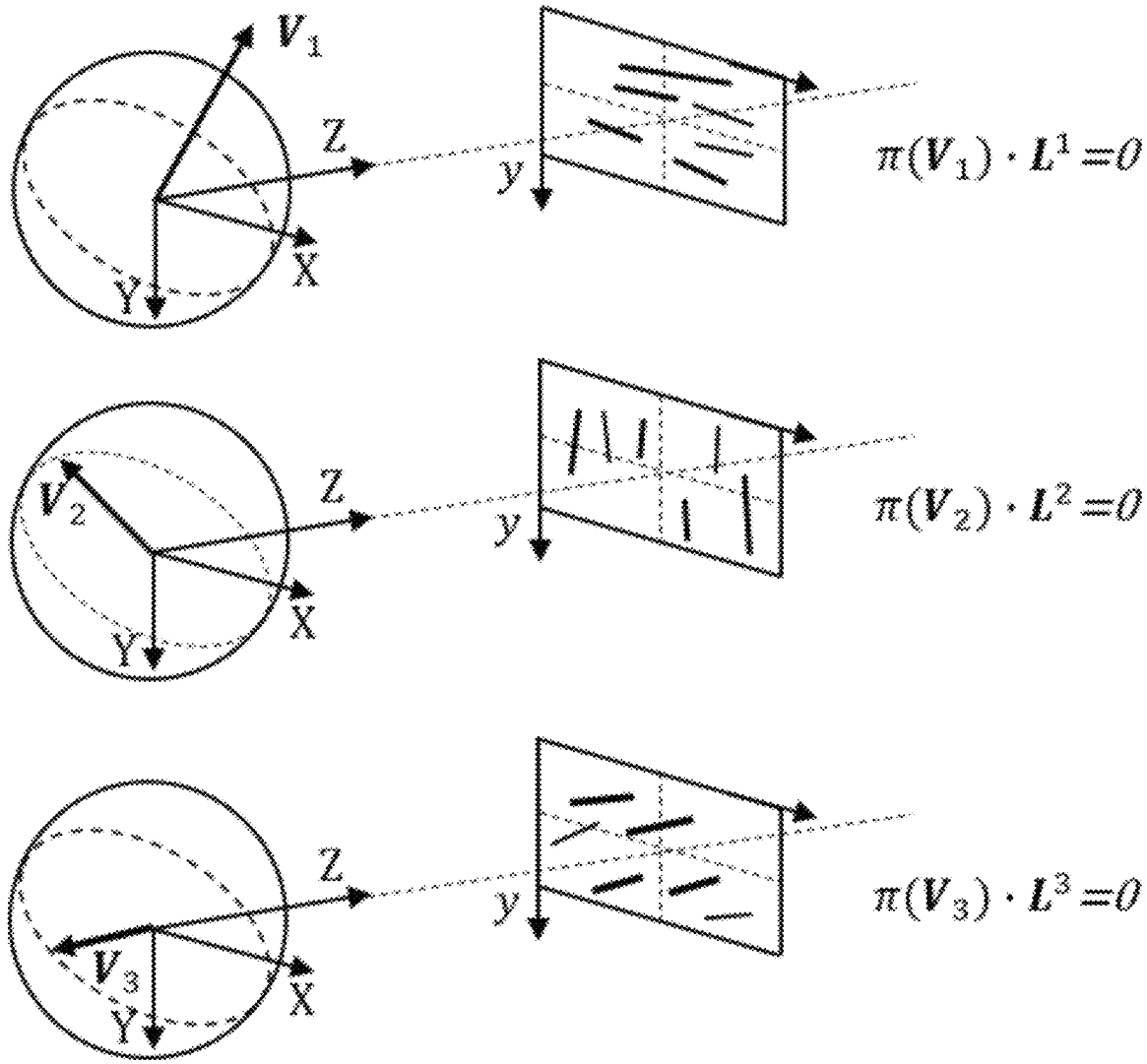
FIG. 5 is a schematic diagram of performing fine estimation on three vanishing directions orthogonal to one another according to an example embodiment.

In a fine estimating module as shown in FIG. 5, first, three vanishing points in the current image frame of the initial Manhattan frame are obtained, and inner line segments respectively corresponding to the three vanishing points are obtained. For example, when an intersection angle between a line connecting a center point of a segment to a vanishing point and the line segment is equal to or smaller than a preset degree, the line segment is determined as an inner line segment of the vanishing point. One vanishing point may have several inner line segments and the degree of the preset angle may be set depending on needs. Next, coarse estimation values for the three vanishing points are calculated by using the inner line segments $L^1$, $L^2$, $L^3$ of the three vanishing points (corresponding to thicker lines on a plane) the initial Manhattan frame, and the three vanishing directions $L^1$, $L^2$, $L^3$ are optimized through the following expression:

$$\begin{cases} \pi(V_1) \cdot L^1 = 0 \\ \pi(V_2) \cdot L^2 = 0 \\ \pi(V_3) \cdot L^3 = 0 \end{cases}$$

Here, $\pi(\ )$ is coordinate conversion, that is, converted from a camera coordinate system to an image coordinate system. A rotation $R=[UV^T]$ between the Manhattan world and a camera frame, for example, the image frame, may be calculated by the three vanishing directions that are finally optimized, and here, $[U,D,V]=SVD[V_1, V_2, V_3]$, that is, the Manhattan frame.

In an example embodiment, performing re-identification on the basis of the second class point, second class line, and Manhattan frame and obtaining point-line re-identification constraint and Manhattan frame re-identification constraint corresponding thereto includes obtaining a key image frame before the current image frame, obtaining a corresponding spatiotemporally-sensitive global sub map, based on the current image frame and the key image frame, and obtaining corresponding point-line re-identification constraint and Manhattan frame re-identification constraint by performing re-identification on the second class point, second class line, and Manhattan frame on the basis of the spatiotemporally-sensitive global sub map.

Hereinafter, two aspects of obtaining the spatiotemporally-sensitive global sub map and re-identification on the Manhattan frame will be described in detail.

In an example embodiment, the obtaining of the corresponding spatiotemporally-sensitive global sub map on the basis of the current image frame and the key image frame may include obtaining a corresponding spatiotemporally-sensitive global sub map on the basis of a time sequence relationship between the current image frame and the key image frame and the space relationship between a three-dimensional map corresponding to the current image frame and a three-dimensional map corresponding to the key image frame.

In detail, the obtaining of the corresponding spatiotemporally-sensitive global sub map on the basis of the time sequence relationship between the current image frame and the key image frame and the space relationship between the three-dimensional map corresponding to the current image frame and the three-dimensional map corresponding to the key image frame may include obtaining a reference key image frame of the current image frame, based on the time sequence relationship between the current image frame and the key image frame, obtaining a two-dimensional space distribution between the reference image frame and the key image frame, on the basis of the space relationship between a three-dimensional map corresponding to the current image frame and a three-dimensional map corresponding to the key image frame, and using a key image frame, which has a region overlapping with the reference key image frame on the two-dimensional space distribution, as the key image frame having a spatial common view with the current image frame, and obtaining the spatiotemporally-sensitive global sub map on the basis of the key image frame having the spatial common view with the current image frame.

Figure 6:
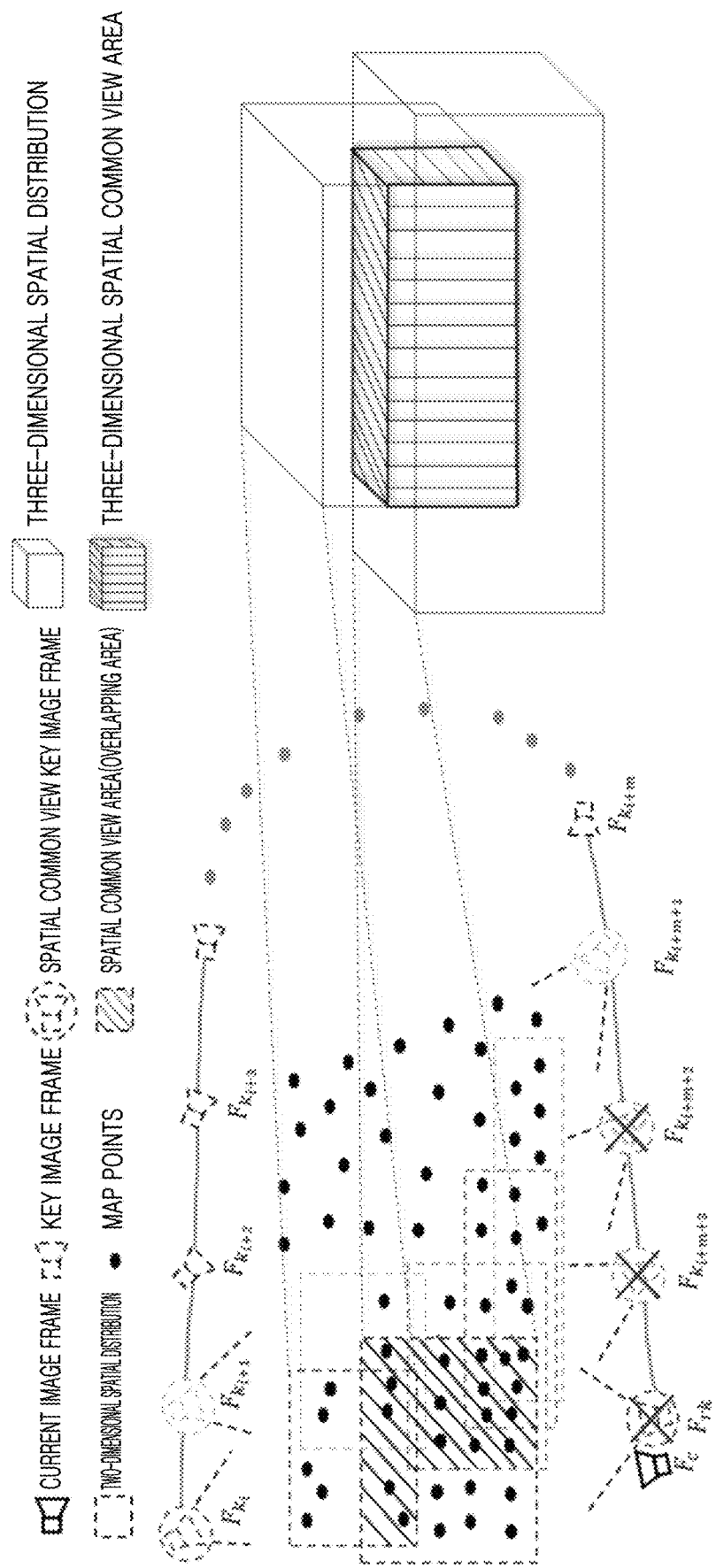
FIG. 6 is a schematic diagram of a spatiotemporally-sensitive global sub map according to an example embodiment.

In detail, as shown in FIG. 6, in the left top-plan view, the camera moves in the clockwise direction, a two-dimensional space distribution of each key image frame is visualized by a rectangle marked with broken lines, and this corresponds to the three-dimensional space distribution marked with a cube in the drawing on the right. The key image frame having a region, for example, a shadow region, overlapping with the space distribution of the reference key image frame $F_{rk}$ of the current image frame $F_c$ is considered as the key image frame having the spatial common view $F_{k_i}, F_{k_{i+1}}, F_{k_{i+m-1}}, F_{k_{i+m+2}}, F_{k_{i+m+3}}$ with the current image frame, and the key image frame having the spatiotemporal common view, which is relatively apart from the current image frame in terms of time, constructs the spatiotemporally-sensitive global sub map of the current image frame, that is, $F_{k_i}, F_{k_{i+1}}, F_{k_{i+m+1}}$.

In an example embodiment, the re-identifying of the second class point, the second class line, and the Manhattan frame on the basis of the spatiotemporally-sensitive global sub map may include obtaining a key image frame having a spatial common view with the current image frame, on the basis of the spatiotemporally-sensitive global sub map, and obtaining a point, a line, and a Manhattan frame of the spatial common view key image frame, and re-identifying the second class point, the second class line, and the Manhattan frame on the basis of the point, line, and the spatial common view relation Manhattan frame of the spatial common view key image frame.

In detail, the re-identifying of the Manhattan frame on the basis of the spatial common view Manhattan frame of the spatial common view key image frame may include performing a time consistency test on the Manhattan frame, on the basis of the relative rotation error between the Manhattan frame of the current image frame and a corresponding image frame in the first preset time sequence sliding window and a time correlation Manhattan frame when passed on the time consistency test, obtaining a time correlation Manhattan frame of the image frame in the second preset time sequence sliding window corresponding to the current image frame, and the spatial common view correlation Manhattan frame of the third preset time sequence sliding window corresponding to the spatial common view key image frame, and obtaining the relative rotation drift error between the time correlation Manhattan frame and the spatial common view key image frame corresponding thereto, and performing a time-space consistency test on the Manhattan frame on the basis of the relative rotation drift error.

Figure 7:
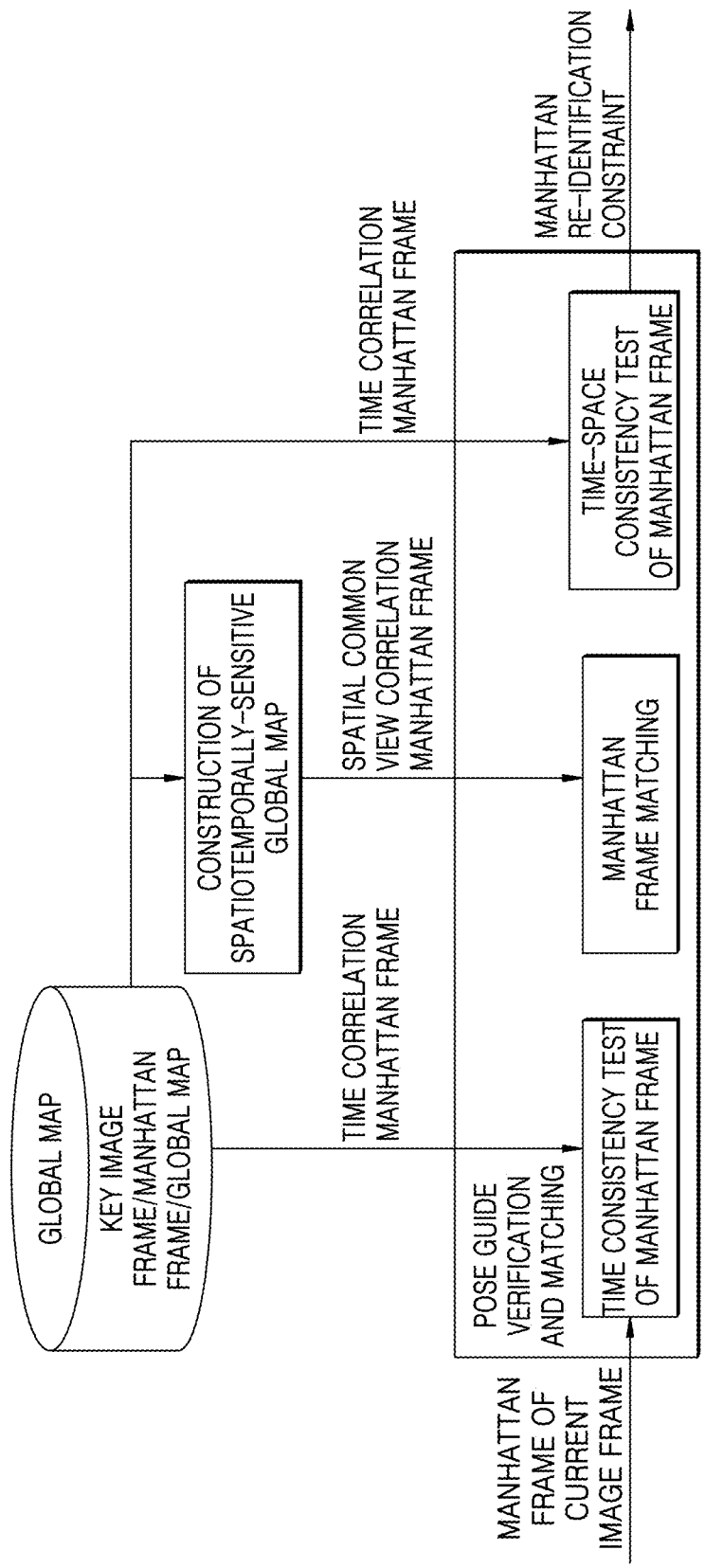
FIG. 7 is a flowchart regarding pose guide verification and matching of a Manhattan frame according to an example embodiment.

For example, in order to cope with a more complicated circumstance and ensure the robustness of Manhattan frame estimation, the example embodiments employ the method of pose guide and verification of the Manhattan frame as shown in FIG. 7 to re-identify the Manhattan frame. The global map generated by the current Manhattan frame and the vision-inertial SLAM is input. First, time consistency between the Manhattan frame of the current image frame and the time correlation Manhattan frame corresponding thereto is examined, and whether the current Manhattan frame is sufficiently robust is checked. Then, the spatial common view correlation Manhattan frame of the Manhattan frame of the current image frame is found by using the spatiotemporally-sensitive global sub map, and is matched with the Manhattan frame of the current image frame. After implementation of the time consistency test and matching of the Manhattan frame, time-space consistency of the Manhattan frame is tested to further increase the robustness of Manhattan frame estimation. Then, a relative rotation set of the Manhattan frame of the current image frame and the spatial common view correlation Manhattan corresponding thereto is output to the back end, for example, the Manhattan frame constraint is input to the back end. Hereinafter, the time consistency test on the Manhattan frame, the matching of the Manhattan frame, and the time-space consistency test on the Manhattan frame will be described in detail.

In an example embodiment, the performing of the time consistency test on the Manhattan frame, on the basis of the relative rotation error between the Manhattan frame of the current image frame and the time correlation Manhattan frame of the image frame in the first preset time sequence sliding window corresponding to the Manhattan frame of the current image frame, may include obtaining a corresponding mean relative rotation error, on the basis of all of the relative rotation errors corresponding to the first preset time sequence sliding window, and allowing the Manhattan frame to pass the time consistency test when the mean relative error is smaller than or equal to a first preset threshold value.

Figure 8:
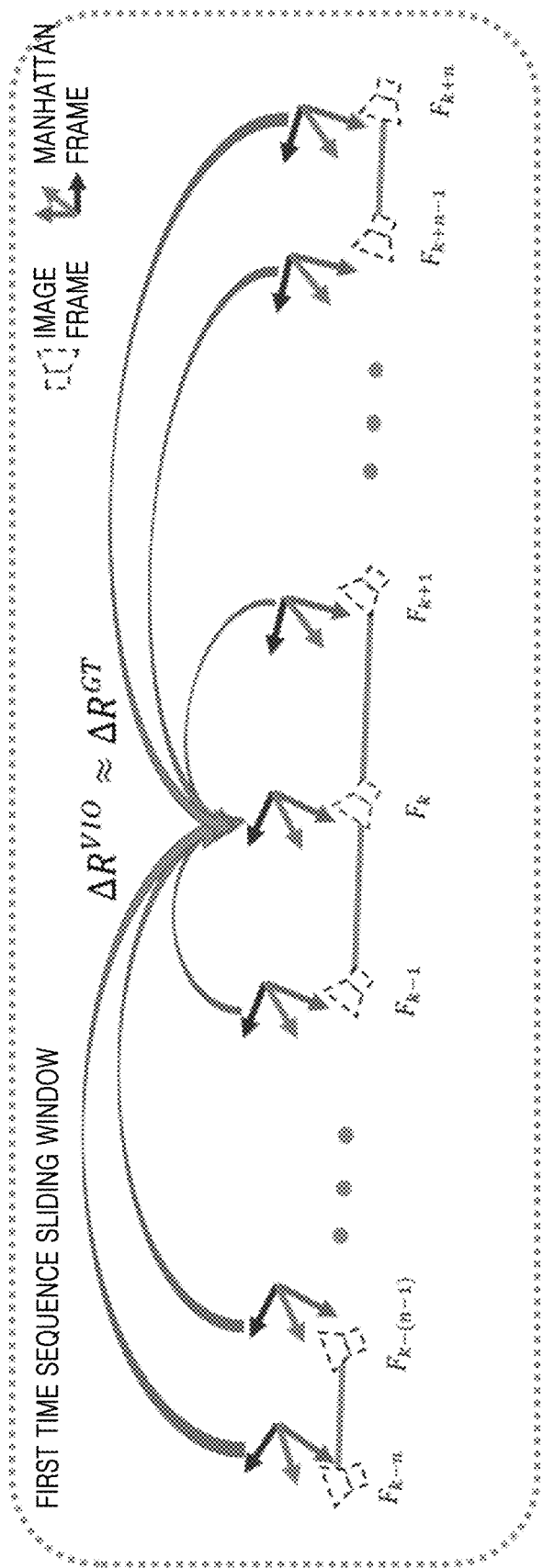
FIG. 8 is a diagram of a time consistency test of a Manhattan frame according to an example embodiment.

In detail, in a visual-inertial odometry (VIO) or the time-inertial SLAM method, relative rotations between image frames in a same time sliding window has a very small error that is similar to a true value of the relative rotation $\Delta R^{GT} \approx \Delta R^{VIO}$. In the example embodiments, a test is performed on the stability and robustness of the Manhattan frame by using this feature. As shown in FIG. 8, a time sequence sliding window, that is, the first time sequence sliding window, includes a series of image frames, that is, $F_{k-n}, \ldots, F_k, \ldots, F_{k+n}$. In the example embodiments, a relative rotation of $\Delta R^{VIO}$ and $\Delta R^{MF}$ between the image frame and another image frame in the time sequence window is calculated by using the VIO method and the Manhattan frame method. The robustness of the Manhattan frame is verified by calculating an error between $\Delta R^{VIO}$ and $\Delta R^{MF}$ in the time sequence sliding window.

In detail, an expression for the mean relative rotation error is as follows:

$$E = \frac{1}{2*n}\sum_{i=k-n, i \neq k}^{k+n} \text{angle}\left((\Delta R_{i,k}^{MF})(\Delta R_{i,k}^{VIO})^{-1}\right)$$

Here, angle ( ) is a function for turning a vector error into an angle scalar error, and a detailed expression thereof is as follows:

$$\text{angle }(R) = \arccos\left(\min(1, \max(-1, \frac{\text{trace}(R)-1}{2}))\right)$$

Here, $\Delta R_{i,k}^{MF}$ indicates a relative rotation between the current image frame and an $i^{th}$ image frame obtained by a Manhattan frame method, and $\Delta R_{i,k}^{VIO}$ indicates a relative rotation between the current image frame and the $i^{th}$ image frame obtained by the VIO method. When E is not greater than the first preset threshold value, that is, when the Manhattan frame passes the time consistency test, the Manhattan frame is matched with a spatial common view correlation Manhattan frame corresponding thereto.

In an example embodiment, the performing of the time-space consistency test on the Manhattan frame on the basis of the relative rotation drift error may include obtaining a ratio occupied by a relative rotation drift error equal to or greater than a second preset threshold value from among relative rotation drift errors corresponding to the second preset time sequence sliding window and the third preset time sequence sliding window, and allowing the Manhattan frame to pass the time-space consistency test when the ratio is equal to or smaller than the third preset threshold value.

Figure 9:
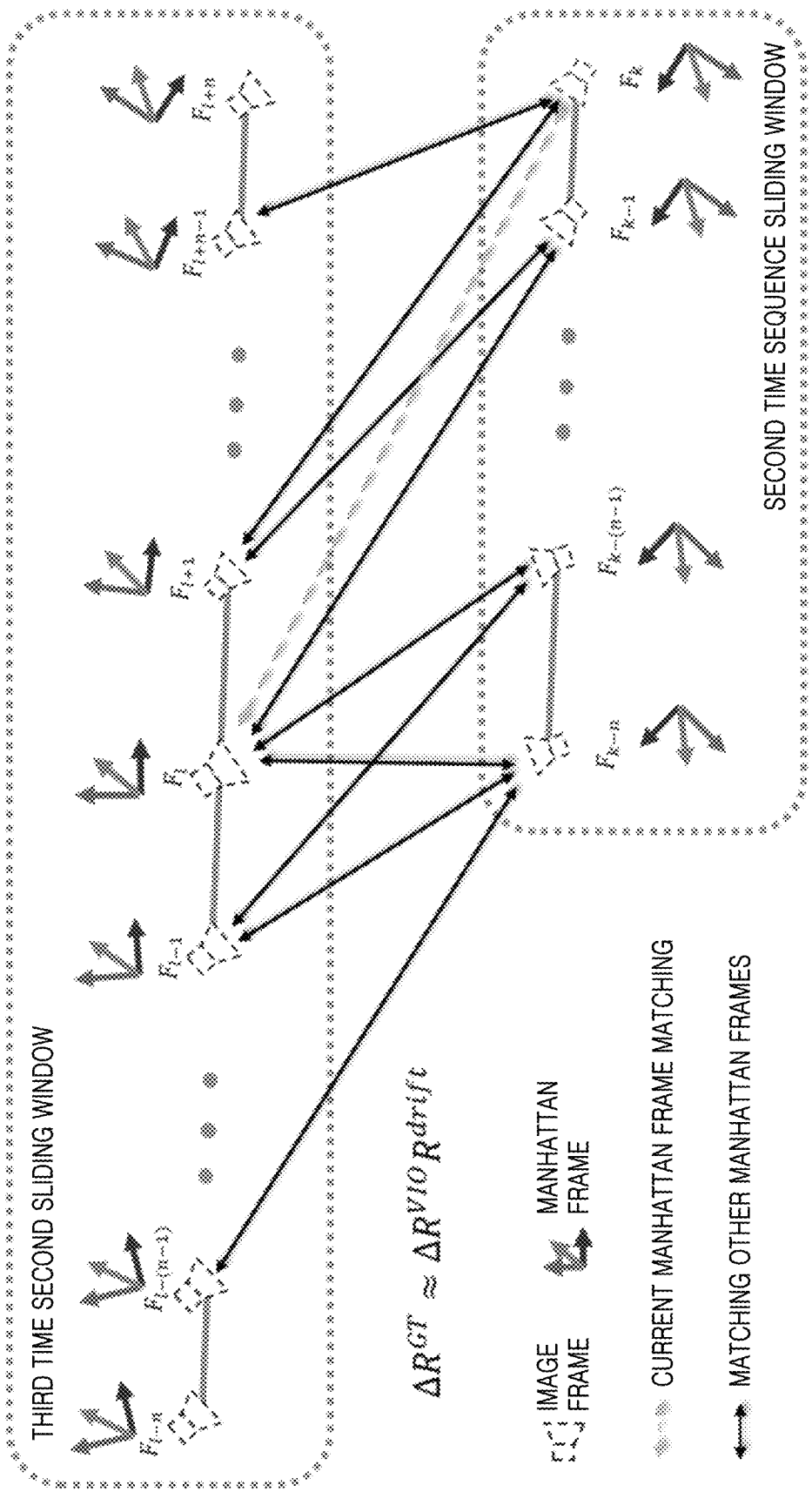
FIG. 9 is a diagram of a time-space consistency test of a Manhattan frame according to an example embodiment.

In detail, when the Manhattan frame satisfies the time consistency and matching, the time-space consistency is inspected to further increase the robustness of Manhattan frame estimation. As shown in FIG. 9, the VIO method generates a consistent drift $R^{drift}$, $\Delta R^{VIO}R^{drift}$ between two different time sequence sliding windows, and is similar or equal to the true value of the relative rotation $\Delta R^{GT}$. This feature is used to further test the stability and robustness of the Manhattan frame. The second preset time sequence sliding window includes $F_l$ and a plurality of image frames temporally adjacent thereto, and the third preset time sequence sliding window includes $F_k$ and a plurality of image frames temporally adjacent thereto.

In detail, a relative rotation drift $R^{drift}$ is calculated by using, $\Delta R^{VIO}$ and $\Delta R^{MF}$ matched with the Manhattan frame in two different time sequence sliding windows, and an expression thereof is as follows:

$$R_{i,j}^{drift} = \Delta R_{i,j}^{MF}(\Delta R_{i,j}^{VIO})^{-1}$$

Next, a relative rotation drift error between the current image frame and another matched image frame is calculated as being equal to or less than the number of second preset threshold values $T_{angle}$:

$$M = \sum_{(i,j) \in V^{mp}, (i,j) \neq (l,k)} G\left(\text{angle}\left(R_{l,k}^{drift}(R_{i,j}^{drift})^{-1}\right)\right)$$

$$G(x) = \begin{cases} 1, & x < T_{angle} \\ 0, & \text{other} \end{cases}$$

Here, $V^{mp}$ indicates a Manhattan frame-matched group between two time sequence sliding windows. In the example embodiment, a ratio is calculated according to the following expression:

$$r = \frac{N - M}{N}$$

Here, N indicates a total number of Manhattan frame matchings between two different time sequence sliding windows. When r is equal to or smaller the third preset threshold value, it is determined that the Manhattan frame satisfies the time-space consistency.

Furthermore, similar to most time-inertial SLAM methods, the example embodiments may estimate the state of an unknown camera, including a camera pose, a ratio, and a three-dimensional map.

The camera pose is described as T=(R,p). Points $X_j$ and lines $Y_l$ in each three-dimensional map are examined in a plurality of image frames by the method of tracking and re-identification. As inertial measurement is also very important in providing a relative movement constraint, the state (T, M) of an inertial measurement unit is measured by pre-integration with respect to inertial measurement, wherein M=(v, b) indicate a speed and a bias, respectively.

Inertial measurement $E^{imu}$ between the image frames in the sliding window $[t_0, t_n]$ and visual measurement EVES on point-line tracking $V^{track}$ and re-identification $V^{reid}$ are processed on the basis of a non-linear optimized framework after local bundle adjustment. When an oldest frame in the sliding window is moved out of the sliding window, visual and inertial measurement corresponding to the oldest frame is converted into a prior error $E^{Prior}$ after bundle adjustment. A function for the local adjustment is defined as follows:

$$E_L = \operatorname*{argmin}_{T_i, M_i, X_j, Y_l} \sum_{i=t_0}^{t_n} \sum_{j,l \in V_i} \text{track} \bigcup V_i^{reid} \left(\|E_{ij}^{vis}(T_i, T_j, X_j)\| + \|E_{i,l}^{vis}(T_i, T_l, Y_l)\|\right) +$$

$$\|E_{t_o}^{prior}(M_{t_o}, T_{t_o})\| + \sum_{i=t_o}^{t_n-1} \|E_{i,i+1}^{imu}(M_i, M_{i+1}, T_i, T_{i+1})\|$$

Here, inertial measurement $E^{imu}$ between all of the key image frames $[k_0, k_n]$, visual measurement $E^{vis}$ on the point-line tracking $V^{track}$ and point-line re-identification $V^{reid}$, and re-identification on the relative rotation $E^{rel\_R}$ of the Manhattan frame are processed on the basis of the non-linear optimized framework after global bundle adjustment. When the oldest key image frame in the time sequence sliding window is moved out of the sliding window, a prior frame corresponding thereto is converted into a relative pose $E^{rel\_T}$ in a global bundle adjustment process. A function for global bundle adjustment is defined as follows:

$$E_G = \operatorname*{argmin}_{T_i, M_i, X_j, Y_l} \sum_{i=k_0}^{k_m} \sum_{j,l \in V_i} \text{track} \bigcup V_i^{reid} \left(\|E_{ij}^{vis}(T_i, T_j, X_j)\| + \|E_{i,l}^{vis}(T_i, T_l, Y_l)\|\right) +$$

$$\sum_i \left\|E_i^{rel\_T}\left(\{T_{k \in \mathcal{L}_i^{prior}}\}\right)\right\| +$$

$$\sum_i \left\|E_i^{rel\_R}\left(\{R_{k \in \mathcal{L}_i^{MF}}\}\right)\right\| + \sum_{i=k}^{k_n-1} \|E_{i,i+1}^{imu}(M_i, M_{i+1}, T_i, T_{i+1})\|$$

Figure 10:
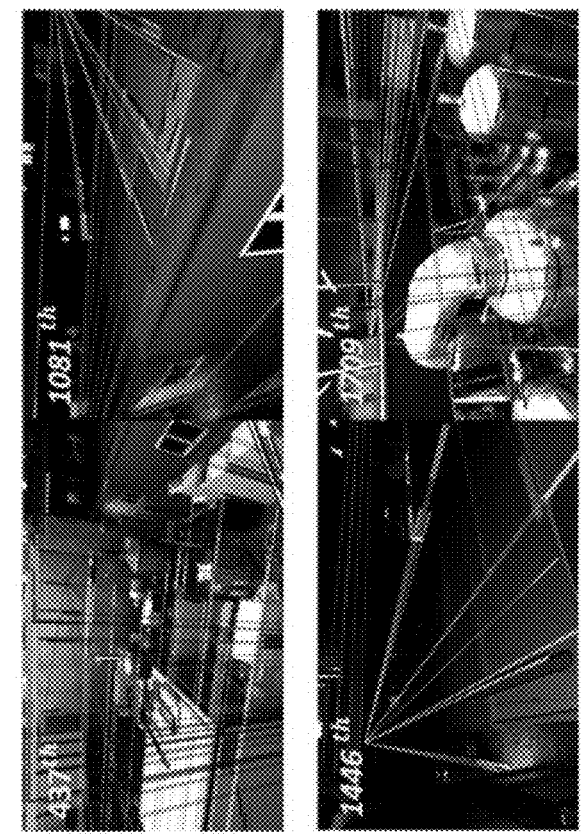
FIG. 10 is a diagram of a SLAM method according to an example embodiment.
Figure 10:
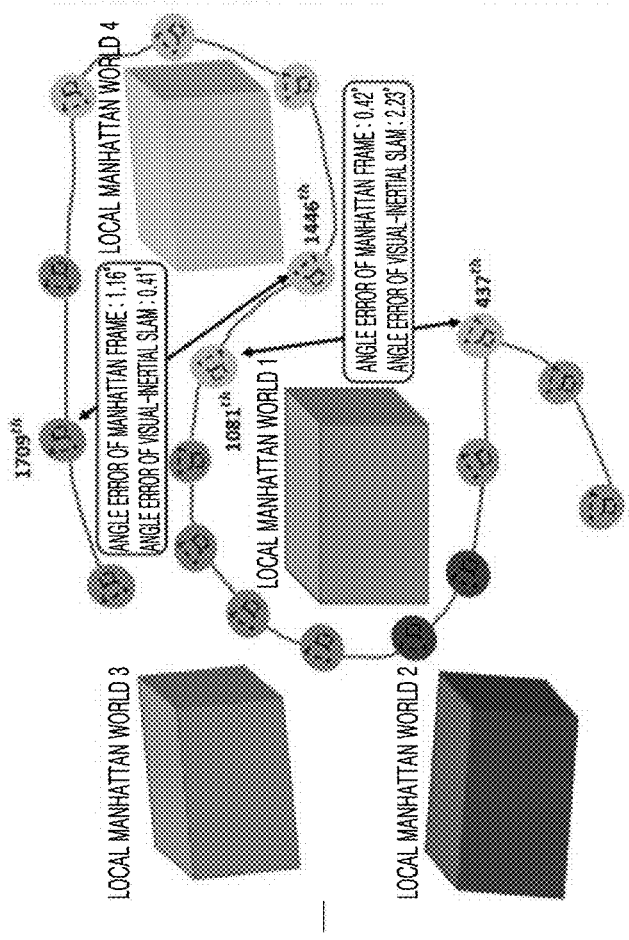

FIG. 10 illustrates a trajectory movement of the camera in a scene including four local Manhattan worlds, and 437th, 1081th, 1446th, and 1709th in the left drawing respectively correspond to images in the right drawing. 437th and 1081th correspond to a same local Manhattan world 4, and the right drawing also illustrates a spatial common view of 437th and 1081th, and accordingly, a relative rotation angle error calculated after the re-identification of the Manhattan frame may be smaller than a value estimated by the visual-inertial SLAM. On the contrary, 1446th and 1709th respectively correspond to different local Manhattan worlds, and at the same time, the right drawing also illustrates that a spatial common view for 1446th and 1709th does not exist, and accordingly, a relative rotation angle error calculated after the matching of the Manhattan frame may be greater than a value estimated by the visual-inertial SLAM.

Figure 11:
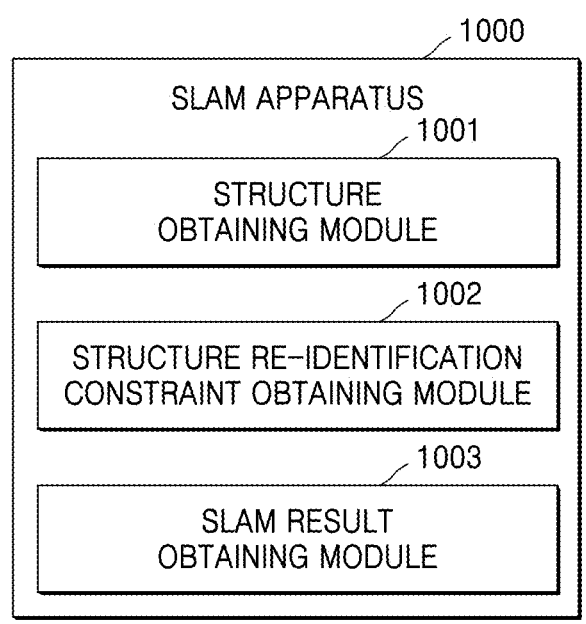
FIG. 11 is a block diagram of a structure of a SLAM device according to embodiments.

FIG. 11 is a structural diagram of a SLAM device 1000 provided in the example embodiments. As shown in FIG. 11, the SLAM device 1000 includes a structure obtaining module 1001, a structure re-identification constraint obtaining module 1002, and a SLAM result obtaining module 1003. The structure obtaining module 1001 is configured to obtain the structure of the current image frame. The structure re-identification constraint obtaining module 1002 is configured to obtain a structure re-identification constraint, according to the structure of the current image frame. and the SLAM result obtaining module 1003 is configured to obtain a SLAM result, based on the structure re-identification constraint.

In the method according to the example embodiments, in a bundle adjustment process of obtaining the SLAM result, introduction of the structure re-identification constraint may lead to better restraint on error accumulation and further increase in the accuracy and robustness in the obtaining of the SLAM result.

In an example embodiment, the SLAM device further includes a point-line re-identification constraint for obtaining points and lines of the current image frame, and re-identifying the points and lines of the current image frame.

In detail, the SLAM result obtaining module is used for obtaining a SLAM result on the basis of the point-line re-identification constraint and the structure re-identification constraint.

In an example embodiment, the structure obtaining module, in detail, is used for obtaining a primary structure based on lines of the current image frame, and optimizing the initial structure on the basis of a line satisfying preset conditions in the current image frames and obtaining a structure.

In an example embodiment, the structure re-identification constraint obtaining module is used for, in detail obtaining a global sub map on the basis of the current image frame and the key image frame, andre-identifying the structure on the basis of the global map and obtaining the structure re-identification constraint.

In an example embodiment, the structure re-identification constraint obtaining module is further used for obtaining a global sub map on the basis of a time sequence relationship between the current image frame and the key image frame, and a spatial relationship between a three-dimensional map corresponding to the current image frame and a three-dimensional map corresponding to the key image frame.

In an example embodiment, the structure re-identification constraint obtaining module is further used for obtaining a reference key image frame of the current image frame on the basis of the time sequence relationship between the current image frame and the key image frame, determining the key image frame, which has an area overlapping with the reference key image frame on a spatial distribution, as a key image frame having a spatial common view with the image of the current image frame, on the basis of the spatial relationship between the three-dimensional map corresponding to the current image frame and the three-dimensional map corresponding to the key image frame, and obtaining a global sub map on the basis of the spatial common view key image frame.

In an example embodiment, the structure re-identification constraint obtaining module is further used for obtaining the spatial common view key image frame of the current image frame on the basis of the global sub map, and re-identifying the structure on the basis of a common view correlation structure of the spatial common view key image frame.

In an example embodiment, the structure re-identification constraint obtaining module is further used for performing a time consistency test on the structure, on the basis of the structure of the current image frame and a time correlation structure of the first preset time sequence sliding window corresponding to the structure of the current image frame, when passed the time consistency test on the structure, matching structures on the basis of a time correlation structure of an image frame in the second preset time sequence sliding window corresponding to the current image frame and a spatial common view correlation structure of the image frame in the third preset time sequence sliding window corresponding to the spatial common view key image frame, and after implementing the matching, performing a time consistency test on the structure, on the basis of the time correlation structure and the spatial common view key image frame corresponding to the time correlation structure.

In an embodiment, the structure re-identification constraint obtaining module is further used for obtaining a relative rotation error between the structure of the current image frame and the time correlation structure of the key image frame in the first preset time sequence sliding window corresponding to the structure of the current image frame, and performing a time consistency test on the structure, on the basis of any kind of relative rotation errors corresponding to the first preset time sequence sliding window.

In an example embodiment, the structure re-identification constraint obtaining module is further used for obtaining a relative rotation drift error between the time correlation structure and the spatial common view key image frame corresponding to the time correlation structure, obtaining relative rotation drift errors corresponding to the second preset time sequence sliding window and the third preset time sequence sliding window, and performing a time-space consistency test, on the basis of the relative rotation drift errors corresponding to the second preset time sequence sliding window and the third preset time sequence sliding window.

In an example embodiment, when the previous image frame is a key frame, the SLAM result obtaining module is specifically used for obtaining a SLAM result after global bundle adjustment, on the basis of the point-line re-identification constraint and the structure re-identification constraint, and obtaining a SLAM result by performing local bundle adjustment on the SLAM result after global bundle adjustment, on the basis of the point-line re-identification constraint of all of the image frames in the fourth preset time sequence sliding window corresponding to the current image frame.

Hereinafter, refer to FIG. 12, which illustrates a structural diagram of an electronic device 1100, for example, a terminal device or a server configured to execute the method of FIG. 2, configured to implement the example embodiments. The electronic device according to the example embodiment may include a mobile terminal such as a mobile phone, a notebook, a digital broadcast transmitter, a personal digital assistant (PDA), a tablet computer (PAD), a portable multimedia player (PMP), a global positioning system (for example, a vehicle navigation terminal), a wearable device and the like, and a fixed terminal such as a digital TV or a desktop personal computer (PC), but is not limited thereto. The electronic device shown in FIG. 12 is merely an example and does not limit functions and the scope of usage of the embodiments.

The electronic device includes a memory and a processor, the memory configured to store a program for execution the method described in the embodiments, and the processor configured to execute the program stored in the memory. Here, the processor may be referred to as a processing device 1101 to be described later, the memory may include a read-only memory (ROM) 1102 to be described later and may further include at least one of a random access memory (RAM) 1103 and a memory device 1108.

Figure 12:
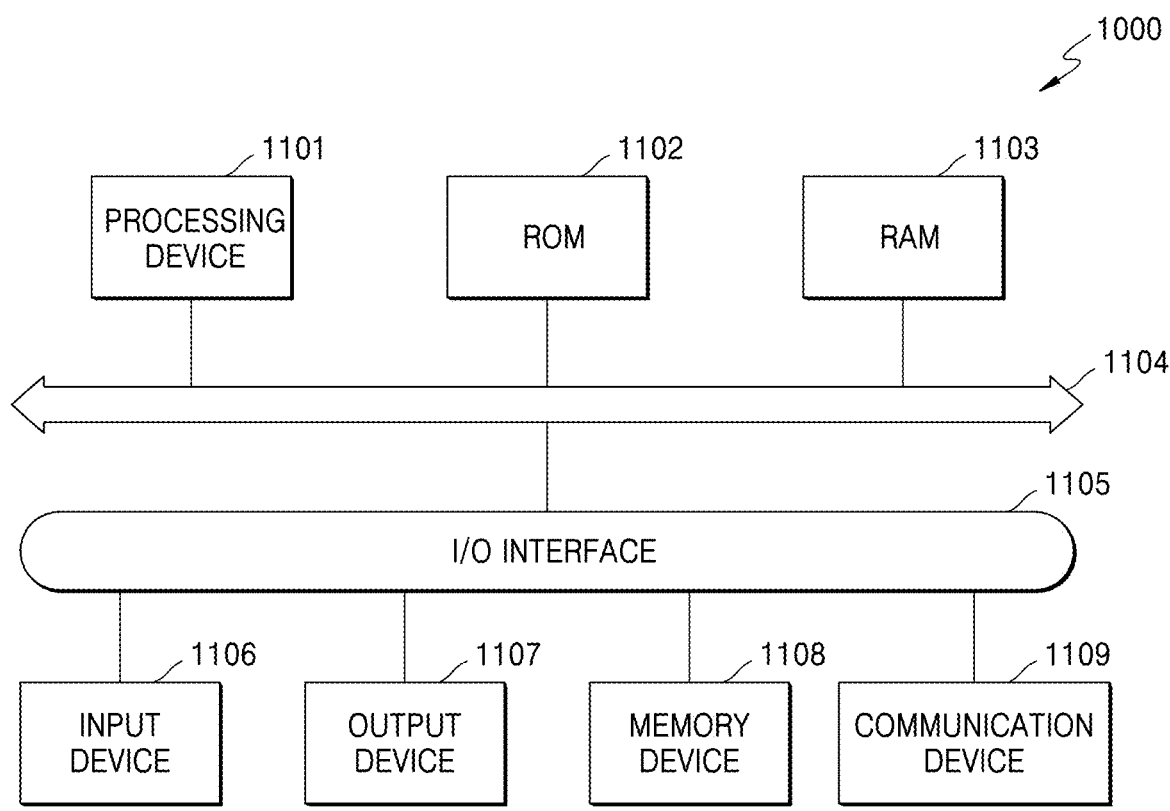
FIG. 12 is a structural diagram of an electronic device provided in embodiments.

As shown in FIG. 12, the electronic device 1100 may include the processing device 1101, for example, a central processing unit (CPU), a graphics processing unit (GPU), and the like configured to execute various kinds of suitable operations and processing according to the program stored in the ROM 1102 or the program loaded on the RAM 1103 from the memory device 1108. The RAM 1103 further includes various programs and data for operation of the electronic device 1100. The processing device 1101, the ROM 1102 and the RAM 1103 are connected to one another through a bus 1104. An input/output (I/O) interface 1105 is also connected to the bus 1104.

Generally, the I/O interface 1105 may be connected to an input device 1106 including a touchscreen, a touchpad, a keyboard, a mouse, a camera, a microphone, an accelerator, a gyroscope, and the like, an output device 1107 including a liquid crystal display (LCD), a speaker, a vibrator, and the like, the memory device 1108 including a magnetic tape, hard disc, and the like, and a communication device 1109. The communication device 1109 may allow the electronic device 1100 to communicate with other devices in a wireless or wired manner to exchange data. Although FIG. 12 illustrates the electronic device including various apparatuses, it is not necessary to execute or include all of the devices shown in FIG. 12. More or less number of apparatuses may be alternatively executed or provided.

Specifically, according to the example embodiments, the process described with reference to the flowchart may be implemented as a computer software program. For example, the embodiments may include a computer program product including a computer program stored in a non-volatile computer-recordable medium, and the computer program may include a program code for executing the method shown in the flowchart. In such embodiments, the computer program may be downloaded from the network and installed through the communication device 1109, may be installed from the memory device 1108, or may be installed from the ROM 1102. When the computer program is installed by the processing device 1101, the functions limited in the methods of the embodiments are executed.

The computer-readable storage medium described above may include a computer-readable signal medium or a computer-readable storage medium, or an arbitrary combination thereof. The computer-readable storage medium may include an electrical, magnetic, optical, electromagnetic, infrared, or semiconductor system, apparatus, or an element, or an arbitrary combination thereof, but is not limited thereto. A more detailed example of the computer-readable storage medium may include, but is not limited to, an electric connection including one or more wires, a magnetic disc for a portable computer, hard disc, random access memory (RAM), read-only memory (ROM), erasable programmable ROM (EPROM or flash memory), an optic fiber, a portable compact disc ROM (CD-ROM), an optical memory device, a magnetic memory device, or an arbitrary and suitable combination thereof. In the embodiments, the computer-readable storage medium may include a visible medium including or storing programs, and the programs may be used by a system, an apparatus, or an element for executing instructions or may be combined thereto for use. In the embodiments, the computer-readable signal medium may include a data signals included in a baseband or transmitted as a part of a carrier wave, and carries a computer-readable program code therein. The transmitted data signals may employ various types, and may include, but is not limited to, an electromagnetic signal, an optic signal, or an arbitrary and suitable combination thereof. The computer-readable signal medium, as an arbitrary computer-readable medium other than the computer-readable storage medium, may be transmit, deliver, and transfer programs used by a system, an apparatus, or an element executed by instructions or combined to the system, apparatus, or element for use. A program code included in the computer-readable medium may be transmitted by using an arbitrary and suitable medium, and may include an electric wire, an optic cable, radiofrequency and the like or an arbitrary and suitable combination thereof, but is not limited thereto.

In some embodiments, a user terminal and a server may execute communication by using an arbitrary network protocol that is well known or to be researched and developed later, like HyperText Transfer Protocol (HTTP) or and may be connected to digital data communication (for example, a communication network) having an arbitrary type or medium. Examples of the communication network may include local area network ("LAN"), wide area network ("WAN"), network of network (for example, the Internet) and a terminal-to-terminal network (for example, an ad hoc terminal-to-terminal network), and an arbitrary network that is already well-known or to be researched and developed later.

The computer-readable medium described above may be included in the electronic device described above, or may separately exist and not be installed in the electronic device.

One or a plurality of programs are loaded in the computer-readable medium, and when the one or the plurality of programs are executed by the electronic device, the electronic device obtains the structure of the current image frame; obtains the structure re-identification constraint on the basis of the structure of the current image frame, and obtains a SLAM result on the basis of the structure re-identification constraint.

A computer program code for implementing operations of the embodiments may be generated by using one or a plurality of programming design languages or a combination thereof. The programing design language may include an object-oriented programming design language such as Java, Smalltalk, C++, but is not limited thereto, and may include a procedure programming design language such as "C" language or a programming design language similar thereto. The program code may be fully executed on a user computer, may be partially executed on the user computer, may also be executed as an independent software package, may be partially executed on the remote computer, or may be fully executed on the remote computer or the server. When the program code is executed on the remote computer, the remote computer may be connected to the user computer through an arbitrary network such as LAN or WAN, or may be connected to an external computer (for example, connected through the Internet by an Internet service provider).

Flowcharts and block diagrams in the attached drawing illustrate implementable structures, functions, or operations of the system, methods, and the computer programming product according to the embodiments. In this regard, each block in the flowcharts or the block diagrams may denote a part of a module, a program fragment, or a code, and the part of the module, the program fragment, or the code includes one or more executable instructions for implementing provided logic functions. In some replaced embodiments, functions marked in the blocks may be carried out in different orders from those of the functions marked in the drawing. For example, two blocks consecutively marked may be substantially executed at the same time, or may be executed in an opposite order according to occasions, and the order of execution is determined according to related functions. It is noted that combinations of the blocks in the block diagrams and/or flowcharts and blocks in the block diagrams and/or the flowcharts may be implemented by using a dedicated software-based program for executing provided functions or operations, and may also be implemented by using a combination of dedicated hardware and computer instructions.

The modules or units described in the example embodiments may be implemented in a software manner or a hardware manner. Here, the name of the module or unit, according to occasions, may not construct limitations of the unit. For example, a first constraint obtaining module may be described as "a module configured to obtain the first constraint."

In the present disclosure, the functions described above may be at least partially executed by one or a plurality of hardware logic components. For example, as a non-limited example, an available hardware logic component of a desirable type includes a field programmable gate array (FPGA), an application-specific integrated circuit (ASIC), an application-specific standard product (ASSP), a system on chip (SOC), a complex programmable logic device (CPLD), and the like.

Throughout the context, a robot-readable medium may include or store a visible medium including or storing a program provided to an instruction execution system, apparatus, or device or combined to the instruction execution system, apparatus, or device for use. The robot-readable medium may include a robot-readable signal medium or a robot-readable storage medium. The robot-readable medium may include an electronic, magnetic, optic, electromagnetic, infrared ray, or semiconductor system, apparatus, device or any arbitrary combinations thereof, but is not limited thereto. A more detailed example of the robot-readable storage medium may include an electrical connection by one or a plurality of lines, a portable computer disc, hard disc, RAM, EPROM or flash memory, an optic fiber, CD-ROM, an optical storage device, a magnetic storage device, or any suitable combinations thereof.

It will be understood that those skilled in the art, for convenience and brevity of explanation, may refer to corresponding operations written in the embodiment s with respect to specific methods that are implemented when the computer-readable medium is executed by an electronic device, and therefore, the descriptions will not be repeated.

While example embodiments have been described with reference to the figures, it will be understood by those of ordinary skill in the art that various changes in form and details may be made therein without departing from the spirit and scope as defined by the following claims and their equivalents.

What is claimed is:

1. A method of visual-inertial simultaneous localization and mapping (SLAM), the method comprising:
    detecting features of points and lines from a current image frame;
    obtaining a Manhattan frame of the current image frame using the detected features of the lines;
    constructing a spatiotemporally-sensitive global sub map using a global map generated by visual-inertial SLAM;
    re-identifying the Manhattan frame by re-identifying the points and lines using the spatiotemporally-sensitive global sub map;
    obtaining a re-identification constraint with regard to a relationship among the points, the lines, and the Manhattan frame based on the re-identification; and
    obtaining a SLAM result based on the re-identification constraint.

2. The method of claim 1, wherein the obtaining of the SLAM result based on the re-identification constraint comprises obtaining the SLAM result based on a point-line re-identification constraint and a Manhattan frame re-identification constraint.

3. The method of claim 1, wherein the obtaining of the Manhattan frame of the current image frame comprises:
    obtaining a primary Manhattan frame of the current image frame based on the lines of the current image frame; and
    optimizing the primary Manhattan frame based on the lines that satisfy preset conditions in the current image frame, to obtain the Manhattan frame.

4. The method of claim 1, wherein the obtaining of the re-identification constraint comprises:
    obtaining the global sub map based on the current image frame and a key image frame, and
    wherein the re-identifying of the Manhattan frame comprises re-identifying the Manhattan frame based on the global sub map to obtain the re-identification constraint.

5. The method of claim 4, wherein the obtaining of the global sub map comprises:
    obtaining the global sub map based on a time sequence relationship between the current image frame and the key image frame; and
    obtaining a spatial relationship between local Manhattan worlds respectively corresponding to the current image frame and the key image frame.

6. The method of claim 5, wherein the obtaining of the global sub map, based on the time sequence relationship and the spatial relationship comprises:
    obtaining a reference key image frame of the current image frame based on the time sequence relationship between the current image frame and the key image frame;
    determining the key image frame, which has an area overlapping with the reference key image frame on a spatial distribution, as a key image frame having a spatial common view with the current image frame, based on the spatial relationship; and
    obtaining the global sub map based on the key image frame having the spatial common view.

7. The method of claim 6, wherein the re-identifying of the Manhattan frame based on the global sub map comprises:
    obtaining the key image frame having the spatial common view with the current image frame based on the global sub map; and
    re-identifying the Manhattan frame based on a common view correlation Manhattan frame of the key image frame having the spatial common view.

8. The method of claim 7, wherein the re-identifying of the Manhattan frame based on the common view correlation Manhattan frame comprises:
    performing a time consistency test on the Manhattan frame based on the Manhattan frame of the current image frame and a time correlation Manhattan frame of a first preset time sequence sliding window corresponding to the Manhattan frame of the current image frame;
    matching Manhattan frames based on the time correlation Manhattan frame of an image frame in a second preset time sequence sliding window corresponding to the current image frame and a spatial common view correlation Manhattan frame of a frame in a third preset time sequence sliding window corresponding to the key image frame having the spatial common view based on the time consistency test on the Manhattan frame having passed; and
    performing a time-space consistency test on the Manhattan frame based on the time correlation Manhattan frame and the key image frame having the spatial common view corresponding to the time correlation Manhattan frame.

9. The method of claim 8, wherein the performing of the time consistency test on the Manhattan frame, based on the Manhattan frame of the current image frame and the time correlation Manhattan frame of the first preset time sequence sliding window corresponding to the Manhattan frame of the current image frame, comprises:
    obtaining a relative rotation error between the Manhattan frame of the current image frame and the time correlation Manhattan frame of the image frame in the first preset time sequence sliding window corresponding to the Manhattan frame of the current image frame; and
    performing the time consistency test on the Manhattan frame based on every relative rotation error corresponding to the first preset time sequence sliding window.

10. The method of claim 8, wherein the performing of the time-space consistency test on the Manhattan frame, based on the time correlation Manhattan frame and the key image frame having the spatial common view corresponding to the time correlation Manhattan frame, comprises:
    obtaining a relative rotation drift error between the time correlation Manhattan frame and the key image frame having the spatial common view corresponding to the time correlation Manhattan frame;

obtaining relative rotation drift errors corresponding to the second preset time sliding window and the third preset time sequence sliding window; and performing the time-space consistency test based on the relative rotation drift errors corresponding to the second preset time sequence sliding window and the third preset time sequence sliding window.

11. The method of claim 1, wherein the obtaining of the SLAM result, based on the point-line re-identification constraint and the Manhattan frame re-identification constraint, comprises:

obtaining a SLAM result after global bundle adjustment based on the point-line re-identification constraint and the Manhattan frame re-identification constraint; and obtaining the SLAM result by performing local bundle adjustment on the SLAM result after the global bundle adjustment based on a point-line re-identification constraint of all image frames in a fourth preset time sequence sliding window corresponding to the current image frame.

12. An apparatus for visual-inertial simultaneous localization and mapping (SLAM), the apparatus comprising:

at least one processor configured to:
detect features of points and lines from a current image frame;
obtain a Manhattan frame of the current image frame using the detected features of the lines;
construct a spatiotemporally-sensitive global sub map using a global map generated by visual-inertial SLAM;
re-identify the Manhattan frame by re-identifying the points and lines using the spatiotemporally-sensitive global sub map;
obtain a re-identification constraint with regard to a relationship among the points, the lines, and the Manhattan frame based on the re-identification; and
obtain a SLAM result based on the re-identification constraint.

13. An electronic device comprising:
a memory configured to store a computer program; and
a processor configured to execute the computer program to implement a method comprising:
detecting features of points and lines from a current image frame;
obtaining a Manhattan frame of the current image frame using the detected features of the lines;
constructing a spatiotemporally-sensitive global sub map using a global map generated by a visual-inertial simultaneous localization and mapping (SLAM);
re-identifying the Manhattan frame by re-identifying the points and lines using the spatiotemporally-sensitive global sub map;
obtaining a re-identification constraint with regard to a relationship among the points, the lines, and the Manhattan frame based on the re-identification; and
obtaining a SLAM result based on the re-identification constraint.

14. A non-transitory computer-readable storage medium having stored thereon a computer program which, when executed, implements a method comprising:
detecting features of points and lines from a current image frame;
obtaining a Manhattan frame of the current image frame using the detected features of the lines;
constructing a spatiotemporally-sensitive global sub map using a global map generated by a visual-inertial simultaneous localization and mapping (SLAM);
re-identifying the Manhattan frame by re-identifying the points and lines using the spatiotemporally-sensitive global sub map;
obtaining a re-identification constraint with regard to a relationship among the points, the lines, and the Manhattan frame based on the re-identification; and
obtaining a SLAM result based on the re-identification constraint.

15. The electronic device of claim 13, wherein the obtaining of the SLAM result based on the re-identification constraint, comprises obtaining the SLAM result based on a point-line re-identification constraint and a Manhattan frame re-identification constraint.

16. The electronic device of claim 13, wherein the obtaining of the Manhattan frame of the current image frame comprises:
obtaining a primary Manhattan frame of the current image frame based on the lines of the current image frame; and
optimizing the primary Manhattan frame based on the lines that satisfy preset conditions in the current image frame, to obtain the Manhattan frame.

17. The electronic device of claim 13, wherein the obtaining of the re-identification constraint comprises
obtaining the global sub map based on the current image frame and a key image frame, and
wherein the re-identifying of the Manhattan frame comprise re-identifying the Manhattan frame based on the global sub map to obtain the re-identification constraint.

18. The electronic device of claim 17, wherein the obtaining of the global sub map comprises:
obtaining the global sub map based on a time sequence relationship between the current image frame and the key image frame; and
obtaining a spatial relationship between local Manhattan worlds respectively corresponding to the current image frame and the key image frame.

19. The electronic device of claim 18, wherein the obtaining of the global sub map, based on the time sequence relationship and the spatial relationship comprises:
obtaining a reference key image frame of the current image frame based on the time sequence relationship between the current image frame and the key image frame;
determining the key image frame, which has an area overlapping with the reference key image frame on a spatial distribution, as a key image frame having a spatial common view with the current image frame, based on the spatial relationship; and
obtaining the global sub map based on the key image frame having the spatial common view.

20. The electronic device of claim 19, wherein the re-identifying of the Manhattan frame based on the global sub map comprises:
obtaining the key image frame having the spatial common view with the current image frame based on the global sub map; and
re-identifying the Manhattan frame based on a common view correlation Manhattan frame of the key image frame having the spatial common view.

* * * * *